(12) United States Patent
Hayes

(10) Patent No.: US 9,854,787 B1
(45) Date of Patent: Jan. 2, 2018

(54) FECAL MATTER COLLECTION DEVICE

(71) Applicant: Camille Hayes, Jamaica, NY (US)

(72) Inventor: Camille Hayes, Jamaica, NY (US)

(*) Notice: Subject to any disclaimer, the term of this patent is extended or adjusted under 35 U.S.C. 154(b) by 0 days.

(21) Appl. No.: 15/635,341

(22) Filed: Jun. 28, 2017

(51) Int. Cl.
*A01K 29/00* (2006.01)
*E01H 1/12* (2006.01)
*A01K 23/00* (2006.01)

(52) U.S. Cl.
CPC .................. *A01K 23/005* (2013.01)

(58) Field of Classification Search
CPC ..... A01K 23/005; A01K 29/00; E01H 1/1206
USPC ............ 294/1.3, 1.4, 1.5; 383/33; D30/162; 15/257.6, 257.7
See application file for complete search history.

(56) References Cited

U.S. PATENT DOCUMENTS

| | | | | |
|---|---|---|---|---|
| 497,401 | A * | 5/1893 | Bates | A47L 13/52 15/257.7 |
| 3,606,436 | A * | 9/1971 | Lynch | E01H 1/1206 294/1.4 |
| 4,014,584 | A * | 3/1977 | Bau | E01H 1/1206 294/1.4 |
| 4,097,082 | A * | 6/1978 | Orofino | E01H 1/1206 294/1.4 |
| 4,210,351 | A * | 7/1980 | Orofino | E01H 1/1206 294/1.4 |
| 4,262,948 | A * | 4/1981 | Emme | A01K 23/005 294/1.5 |
| 4,641,873 | A * | 2/1987 | Nurnberger | E01H 1/1206 294/1.4 |
| 4,852,924 | A | 8/1989 | Ines | |
| 5,033,781 | A * | 7/1991 | Flood | E01H 1/1206 15/257.6 |
| 5,269,575 | A | 12/1993 | Parvaresh | |
| 5,295,721 | A * | 3/1994 | Wu | E01H 1/1206 15/257.6 |
| D558,416 | S | 12/2007 | Kenny | |
| 8,109,547 | B1 * | 2/2012 | Miller | A01K 23/005 294/1.4 |
| 8,146,967 | B1 | 4/2012 | Brown | |
| 8,177,270 | B2 | 5/2012 | Chen | |
| 8,632,109 | B2 | 1/2014 | Zidulka et al. | |
| 9,131,661 | B2 | 9/2015 | Spandau | |

FOREIGN PATENT DOCUMENTS

WO    WO2011029384    3/2011

* cited by examiner

*Primary Examiner* — Paul T Chin

(57) ABSTRACT

A fecal matter collection device for sanitary collection of feces from a pet includes a rod. A tube is slidably positioned around the rod. A first plate is coupled to and extends transversely from a bottom of the rod. Each of a pair of lines is coupled to and extends between the tube and a respective corner of the first plate distal from rod. Each of a plurality of liners is substantially complementary to, positionable on, and selectively couplable to the first plate. Each opposing side of the liner is selectively couplable to a respective line. The first plate is configured to intercept fecal matter that drops from a squatting pet. The liner separates the fecal matter from the first plate. The lines are positioned to compel the liner to separate from the first plate as the tube is motivated from a midpoint toward a top of the rod.

12 Claims, 5 Drawing Sheets

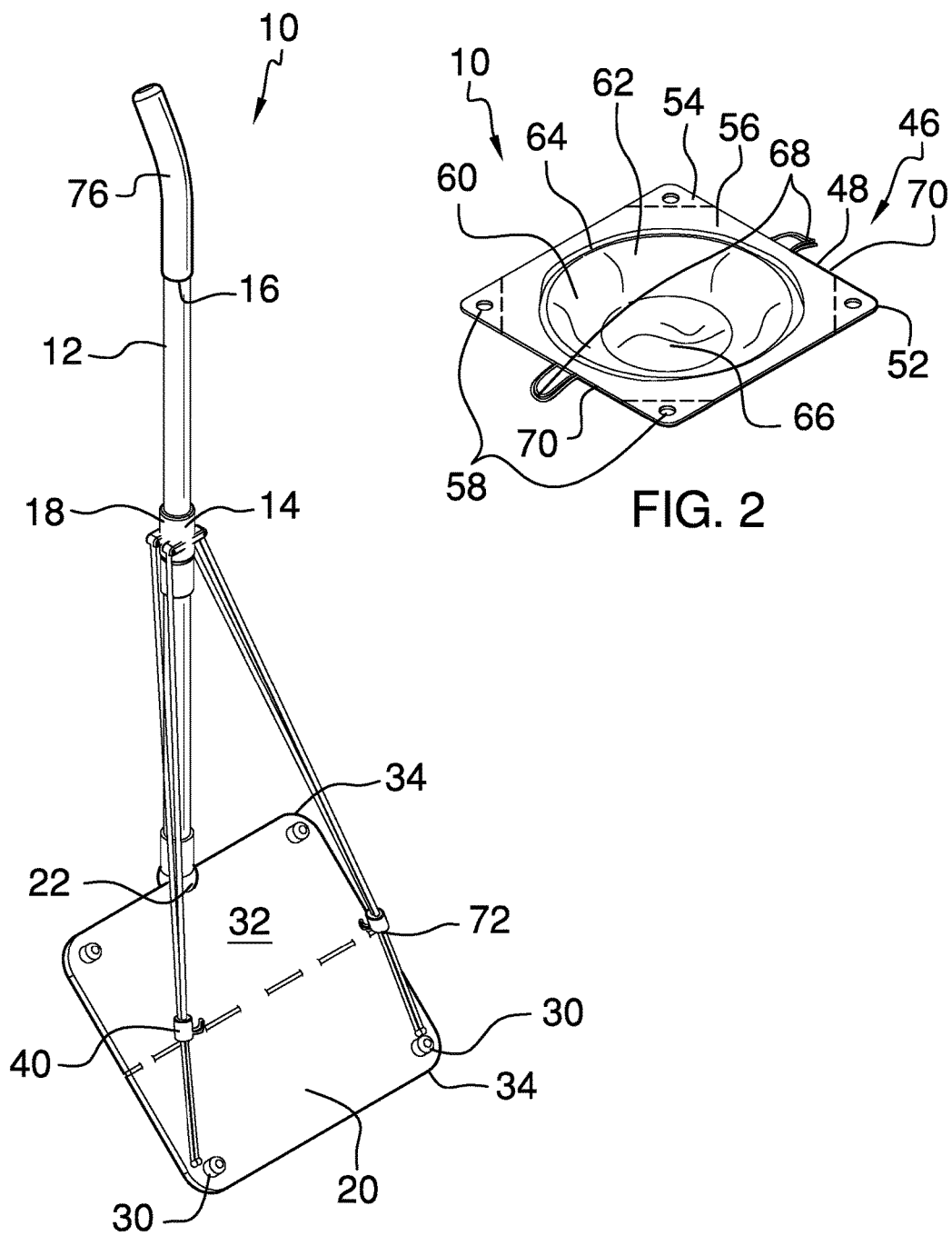

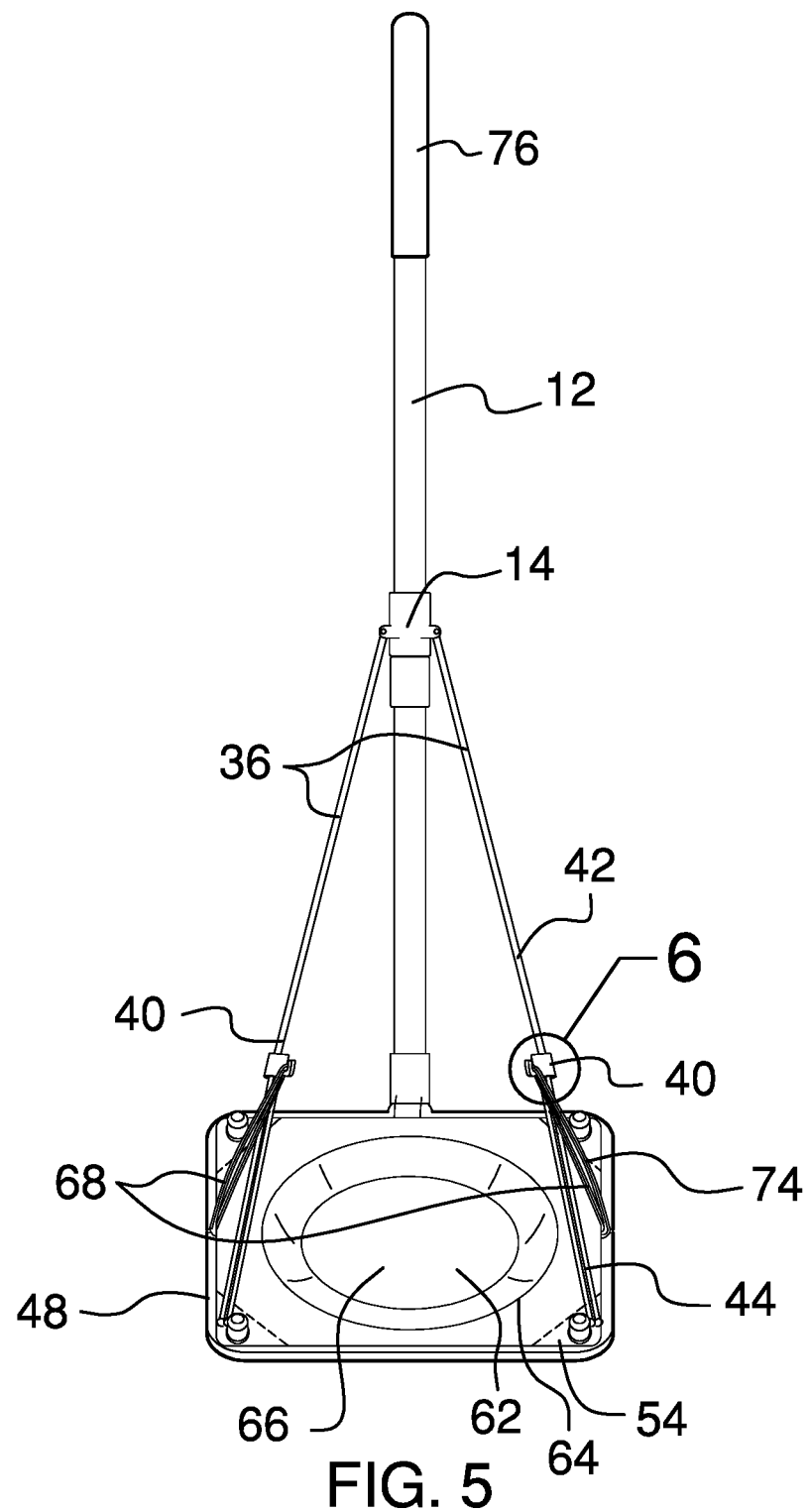

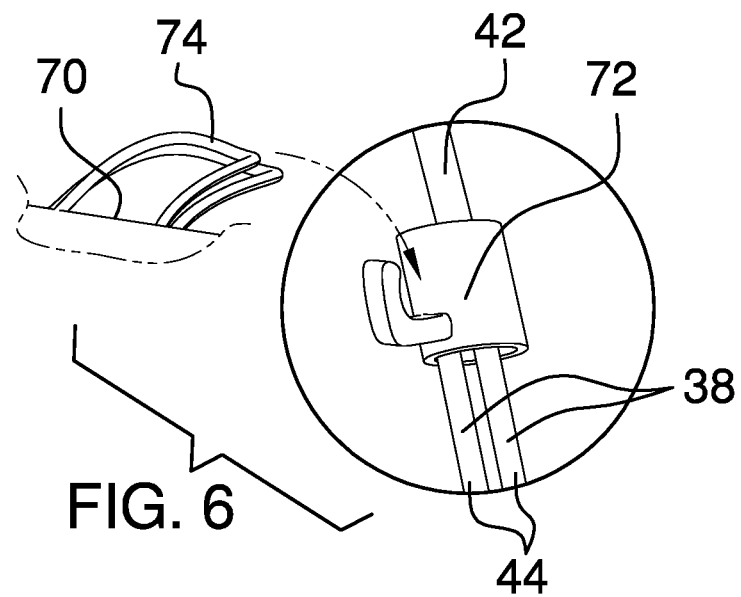

FECAL MATTER COLLECTION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to collection devices and more particularly pertains to a new collection device for sanitary collection of feces from a pet.

BRIEF SUMMARY OF THE INVENTION

An embodiment of the disclosure meets the needs presented above by generally comprising a rod. A tube is slidably positioned around the rod. A first plate is coupled to and extends transversely from a bottom of the rod. Each of a pair of lines is coupled to and extends between the tube and a respective corner of the first plate distal from rod. Each of a plurality of liners is substantially complementary to, positionable on, and selectively couplable to the first plate. Each opposing side of the liner is selectively couplable to a respective line. The first plate is configured to intercept fecal matter that drops from a squatting pet. The liner separates the fecal matter from the first plate. The lines are positioned to compel the liner to separate from the first plate as the tube is motivated from a midpoint toward a top of the rod.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric perspective view of a fecal matter collection device according to an embodiment of the disclosure.

FIG. 2 is an isometric perspective view of an embodiment of the disclosure.

FIG. 5 is a front view of an embodiment of the disclosure.

FIG. 6 is a detail view of an embodiment of the disclosure.

DETAILED DESCRIPTION OF THE INVENTION

Figure 3:
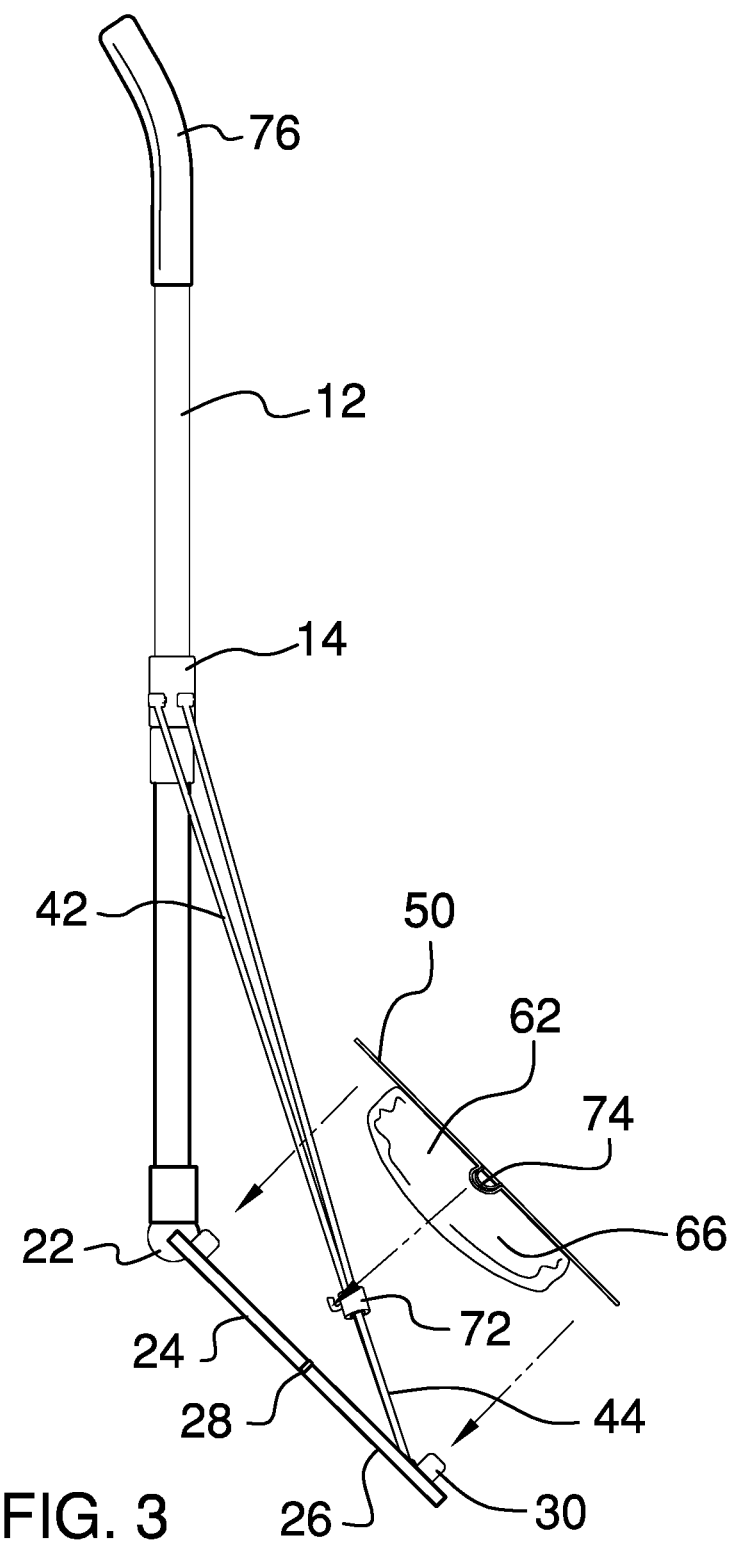
FIG. 3 is a side view of an embodiment of the disclosure.
Figure 4:
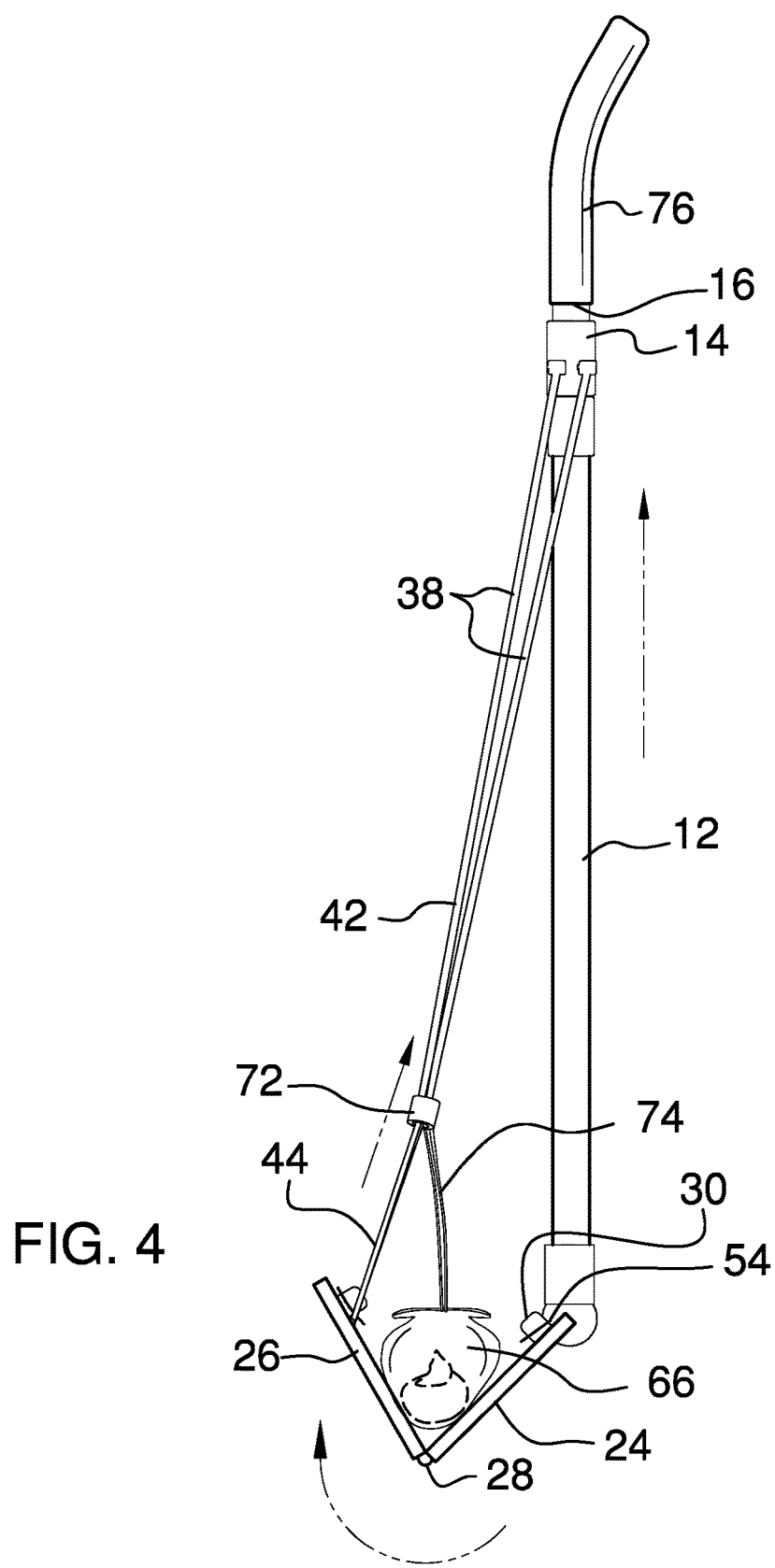
FIG. 4 is an in-use view of an embodiment of the disclosure.

With reference now to the drawings, and in particular to FIGS. 1 through 6 thereof, a new collection device embodying the principles and concepts of an embodiment of the disclosure and generally designated by the reference numeral 10 will be described.

As best illustrated in FIGS. 1 through 6, the fecal matter collection device 10 generally comprises a rod 12. In one embodiment, the rod 12 is circularly shaped when viewed longitudinally. A tube 14 is positioned around the rod 12. The tube 14 is slidably positionable between a top 16 and midpoint 18 of the rod 12.

A first plate 20 is coupled to and extends transversely from a bottom 22 of the rod 12. The first plate 20 is configured to position to intercept fecal matter as the fecal matter drops from a squatting pet. In one embodiment, the first plate 20 comprises a second plate 24 and a third plate 26. The second plate 24 is coupled to the rod 12. The third plate 26 is spring-hingedly coupled to and extends from the second plate 24 distal from the rod 12. In another embodiment, a hinge 28 is coupled to and extends between the second plate 24 and the third plate 26. The hinge 28 is spring-loaded. The second plate 24 and the third plate 26 are biased to an open configuration wherein the second plate 24 and the third plate 26 are substantially coplanarly positioned.

Each of a set of four pins 30 is coupled to and extends from an upper surface 32 proximate to a respective corner 34 of the first plate 20. Each of a pair of lines 36 is coupled to and extends between the tube 14 and a respective corner 34 of the first plate 20 distal from rod 12. In one embodiment, each line 36 comprises a pair of cords 38. Each of a pair of first couplers 40 is coupled to a respective line 36 and defines an upper section 42 and a lower section 44 of the respective line 36. In one embodiment, the lower section 44 of the line 36 is resilient.

Each of a plurality of liners 46 is substantially complementary to the upper surface 32 of the first plate 20. The liner 46 is positionable on and selectively couplable to the first plate 20. The liner 46 has opposing sides 48. Each opposing side 48 is selectively couplable to a respective line 36. The liner 46 is configured to separate the fecal matter from the first plate 20. The lines 36 are positioned to compel separation of the liner 46 from the first plate 20 as the tube 14 is motivated toward the top 16 of the rod 12.

In one embodiment, each liner 46 comprises a panel 50 that is substantially complementary to the first plate 20. The panel 50 is perforated proximate to each corner 52 of the panel 50 such that corner sections 54 of the panel 50 are positioned to separate from a central section 56 of the panel 50. Each of a set of four holes 58 is positioned in a respective corner section 54 of the panel 50. The holes 58 are complementary to the pins 30. The holes 58 are positioned in the panel 50 such that each hole 58 is positioned to insert a respective pin 30 to couple the liner 46 to the first plate 20.

An orifice 60 is centrally positioned in the panel 50. In one embodiment, the orifice 60 is circularly shaped. A shell 62 is coupled to and extends between a perimeter 64 of the orifice 60. The shell 62 is dimensionally larger than the orifice 60 so that the shell 62 defines a pouch 66. The pouch 66 is configured to receive the fecal matter as the fecal matter drops from the squatting pet.

Each of a pair of second couplers 68 is coupled to and extendable from a respective opposing edge 70 of the panel 50. The second couplers 68 are complementary to the first couplers 40. The second couplers 68 are positioned to couple to the first couplers 40 to couple the liner 46 to the lines 36.

In one embodiment, the first couplers 40 comprise hooks 72 and each second coupler 68 comprises at least one string 74 that is loopedly coupled to and extendable from the respective opposing edge 70 of the panel 50. Each at least one string 74 is positioned to couple to a respective hook 72 to couple the liner 46 to the lines 36. The at least one strings 74 are positioned to compel separation of the central section 56 of the panel 50 from the corner sections 54 of the panel 50 to separate the liner 46 from the first plate 20 as the tube 14 is motivated toward the top 16 of the rod 12. The lower sections 44 of the lines 36 are positioned to compel the third plate 26 to pivot relative to the second plate 24 as the tube 14 is motivated toward the top 16 of the rod 12.

A handle 76 is coupled to the rod 12 proximate to the top 16. In one embodiment, the handle 76 extends transversely from the top 16 of the rod 12.

In use the holes 58 are positioned in the panel 50 so that each hole 58 is positioned to insert the respective pin 30 to couple the liner 46 to the first plate 20. The at least one string 74 is positioned to couple to the respective hook 72 to couple the liner 46 to the lines 36. The first plate 20 is configured to position to intercept the fecal matter as the fecal matter drops from the squatting pet. The liner 46 is configured to separate the fecal matter from the first plate 20. The pouch 66 is configured to receive the fecal matter as the fecal matter drops from the squatting pet. The at least one strings 74 are positioned on the hooks 72 so that the at least one strings 74 are positioned to compel separation of the central section 56 of the panel 50 from the corner sections 54 of the panel 50 to separate the liner 46 from the first plate 20 as the tube 14 is motivated toward the top 16 of the rod 12. The lower sections 44 of the lines 36 are positioned to compel the third plate 26 to pivot relative to the second plate 24 as the tube 14 is motivated toward the top 16 of the rod 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fecal matter collection device comprising:
   a rod;
   a tube positioned around said rod such that said tube is slidably positionable between a top and midpoint of said rod;
   a first plate coupled to and extending transversely from a bottom of said rod;
   a pair of lines, each said line being coupled to and extending between said tube and a respective corner of said first plate distal from rod;
   a plurality of liners, each said liner being substantially complementary to an upper surface of said first plate, said liner being positionable on and selectively couplable to said first plate, said liner having opposing sides, each said opposing side being selectively couplable to a respective said line; and
   wherein said first plate is positioned on said rod such that said first plate is configured for positioning for intercepting fecal matter as the fecal matter drops from a squatting pet, wherein said liner is positioned on said first plate such that said liner is configured for separating the fecal matter from said first plate, wherein said liner is positioned on said lines such that said lines are positioned for compelling separation of said liner from said first plate as said tube is motivated toward said top of said rod.

2. The device of claim 1, further including said rod being circularly shaped when viewed longitudinally.

3. The device of claim 1, further including said first plate comprising a second plate and a third plate, said second plate being coupled to said rod, said third plate being spring-hingedly coupled to and extending from said second plate distal from said rod.

4. The device of claim 3, further including a hinge coupled to and extending between said second plate and said third plate, said hinge being spring-loaded such that said second plate and said third plate are biased to an open configuration wherein said second plate and said third plate are substantially coplanarly positioned.

5. The device of claim 3, further including a set of four pins, each said pin being coupled to and extending from said upper surface proximate to a respective corner of said first plate.

6. The device of claim 5, further including a pair of first couplers, each said first coupler being coupled to a respective said line defining an upper section and a lower section of said respective said line, said lower section being resilient.

7. The device of claim 6, further including each said liner comprising:
   a panel substantially complementary to said first plate, said panel being perforated proximate to each corner of said panel such that corner sections of said panel are positioned for separating from a central section of said panel;

a set of four holes, each said hole being positioned in a respective said corner section of said panel, said holes being complementary to said pins;

an orifice centrally positioned in said panel, said orifice being circularly shaped;

a shell coupled to and extending between a perimeter of said orifice, said shell being dimensionally larger than said orifice such that said shell defines a pouch;

a pair of second couplers, each said second coupler being coupled to and extendable from a respective said opposing edge of said panel, said second couplers being complementary to said first couplers; and wherein said holes are positioned in said panel such that each said hole is positioned for inserting a respective said pin for coupling said liner to said first plate, wherein said second couplers are positioned on said panel such that said second couplers are positioned for coupling to said first couplers for coupling said liner to said lines, wherein said pouch is positioned in said panel such that said pouch is configured for receiving the fecal matter as the fecal matter drops from the squatting pet.

8. The device of claim 7, further comprising:

said first couplers comprising hooks;

each said second coupler comprising at least one string loopedly coupled to and extending from said respective said opposing edge of said panel; and wherein each said at least one string is positioned on said panel such that said at least one string is positioned for coupling to a respective said hook for coupling said liner to said lines, wherein said at least one strings are positioned on said hooks such that said at least one strings are positioned for compelling separation of said central section of said panel from said corner sections of said panel for separating said liner from said first plate as said tube is motivated toward said top of said rod, wherein said lower sections of said lines are positioned for compelling said third plate to pivot relative to said second plate as said tube is motivated toward said top of said rod.

9. The device of claim 1, further including each said line comprising a pair of cords.

10. The device of claim 1, further including a handle coupled to said rod proximate to said top.

11. The device of claim 10, further including said handle extending transversely from said top of said rod.

12. A fecal matter collection device comprising:

a rod, said rod being circularly shaped when viewed longitudinally;

a tube positioned around said rod such that said tube is slidably positionable between a top and midpoint of said rod;

a first plate coupled to and extending transversely from a bottom of said rod, wherein said first plate is positioned on said rod such that said first plate is configured for positioning for intercepting fecal matter as the fecal matter drops from a squatting pet, said first plate comprising a second plate and a third plate, said second plate being coupled to said rod, said third plate being spring-hingedly coupled to and extending from said second plate distal from said rod;

a set of four pins, each said pin being coupled to and extending from an upper surface proximate to a respective corner of said first plate;

a hinge coupled to and extending between said second plate and said third plate, said hinge being spring-loaded such that said second plate and said third plate are biased to an open configuration wherein said second plate and said third plate are substantially coplanarly positioned;

a pair of lines, each said line being coupled to and extending between said tube and a respective corner of said first plate distal from rod, each said line comprising a pair of cords;

a pair of first couplers, each said first coupler being coupled to a respective said line defining an upper section and a lower section of said respective said line, said lower section being resilient, said first couplers comprising hooks;

a plurality of liners, each said liner being substantially complementary to said upper surface of said first plate, said liner being positionable on and selectively couplable to said first plate, said liner having opposing sides, each said opposing side being selectively couplable to a respective said line, wherein said liner is positioned on said first plate such that said liner is configured for separating the fecal matter from said first plate, wherein said liner is positioned on said lines such that said lines are positioned for compelling separation of said liner from said first plate as said tube is motivated toward said top of said rod, each said liner comprising:

a panel substantially complementary to said first plate, said panel being perforated proximate to each corner of said panel such that corner sections of said panel are positioned for separating from a central section of said panel, a set of four holes, each said hole being positioned in a respective said corner section of said panel, said holes being complementary to said pins, wherein said holes are positioned in said panel such that each said hole is positioned for inserting a respective said pin for coupling said liner to said first plate, an orifice centrally positioned in said panel, said orifice being circularly shaped, a shell coupled to and extending between a perimeter of said orifice, said shell being dimensionally larger than said orifice such that said shell defines a pouch, wherein said pouch is positioned in said panel such that said pouch is configured for receiving the fecal matter as the fecal matter drops from the squatting pet, and a pair of second couplers, each said second coupler being coupled to and extendable from a respective said opposing edge of said panel, said second couplers being complementary to said first couplers, wherein said second couplers are positioned on said panel such that said second couplers are positioned for coupling to said first couplers for coupling said liner to said lines, each said second coupler comprising at least one string loopedly coupled to and extending from said respective said opposing edge of said panel, wherein each said at least one string is positioned on said panel such that said at least one string is positioned for coupling to a respective said hook for coupling said liner to said lines, wherein said at least one strings are positioned on said hooks such that said at least one strings are positioned for compelling separation of said central section of said panel from said corner sections of said panel for separating said liner from said first plate as said tube is motivated toward said top of said rod, wherein said lower sections of said lines are positioned for compelling said third plate to pivot relative to said second plate as said tube is motivated toward said top of said rod;

a handle coupled to said rod proximate to said top, said handle extending transversely from said top of said rod; and wherein said first plate is positioned on said rod such that said first plate is configured for positioning for intercepting the fecal matter as the fecal matter drops from the squatting pet, wherein said holes are positioned in said panel such that each said hole is positioned for inserting said respective said pin for coupling said liner to said first plate, wherein said liner is positioned on said first plate such that said liner is configured for separating the fecal matter from said first plate, wherein said pouch is positioned in said panel such that said pouch is configured for receiving the fecal matter as the fecal matter drops from the squatting pet, wherein each said at least one string is positioned on said panel such that said at least one string is positioned for coupling to said respective said hook for coupling said liner to said lines, wherein said at least one strings are positioned on said hooks such that said at least one strings are positioned for compelling separation of said central section of said panel from said corner sections of said panel for separating said liner from said first plate as said tube is motivated toward said top of said rod, wherein said lower sections of said lines are positioned for compelling said third plate to pivot relative to said second plate as said tube is motivated toward said top of said rod.

* * * * *